Nov. 13, 1923.
C. C. FARMER
BRAKE VALVE DEVICE
Filed Nov. 11, 1922
1,473,759
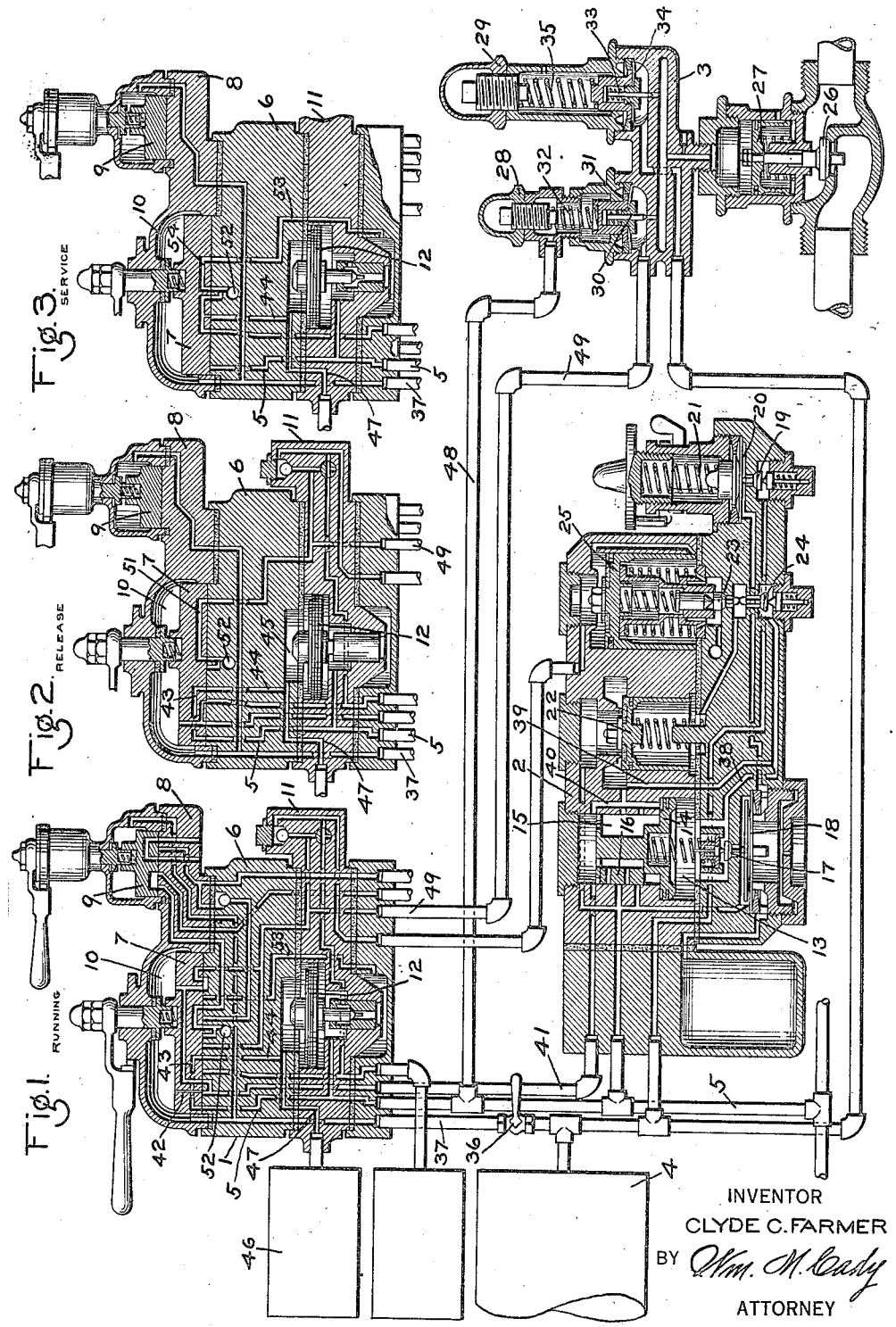
INVENTOR
CLYDE C. FARMER
BY *Wm. M. Cady*
ATTORNEY Patented Nov. 13, 1923.

1,473,759

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed November 11, 1922. Serial No. 600,286.

*To all whom it may concern:*

Be it known that I, CLYDE C. FARMER, a citizen of the United States, residing at Pittsburgh, in the county of Allegheny and State of Pennsylvania, have invented new and useful Improvements in Brake-Valve Devices, of which the following is a specification.

This invention relates to fluid pressure brakes and more particularly to a locomotive brake equipment.

One object of my invention is to provide an improved locomotive brake equipment having means for facilitating the operation of two or more locomotives in double heading service. Another object of my invention is to provide an improved brake valve device.

Other objects and advantages will appear in the following more detailed description of the invention.

In the accompanying drawing; Fig. 1 is a sectional diagrammatic view of a locomotive brake equipment embodying my invention; Fig. 2 a sectional view of the brake valve device, showing the automatic brake valve in release position; and Fig. 3 a sectional view of the brake valve device, showing the automatic brake valve in service application position.

The construction shown in Fig. 1 includes a combined automatic and independent brake valve device 1, a feed valve device 2, a duplex pressure pump governor 3, a main reservoir 4, and a brake pipe 5.

The brake valve device 1 comprises a main section 6 having a seat for the rotary valve 7 of the automatic brake valve portion, a section 8 adapted to be applied to section 6 and having a seat for the rotary valve 9 of the independent brake valve portion and having as an integral part thereof a casing member which encloses the rotary valve 7 and forms the rotary valve chamber 10.

Applied to the under face of the main section 6 is a section 11, containing an equalizing discharge valve mechanism 12 of the usual construction.

The feed valve device 2 is preferably similar to that disclosed in my prior pending application, Serial No. 594,785, filed October 16, 1922, and comprises a casing having a piston chamber 13 containing a feed valve piston 14 and a valve chamber 15 containing a slide valve 16 adapted to be operated by piston 14. A valve 17 controls the venting of fluid from chamber 13 and said valve is adapted to be operated by a diaphragm 18. One side of the diaphragm 18 is open to the brake pipe 5 and the opposite side is subject to fluid pressure maintained constant at a predetermined pressure by the operation of a valve 19 controlled by a diaphragm 20. Said diaphragm is subject to the pressure of an adjustable coil spring 21.

For supplying fluid to the brake pipe at a rapid rate in releasing the brakes, a supply valve is provided, preferably in the form of a valve piston 22. The pressure on one side of the valve piston 22 is controlled by a timing valve mechanism comprising double beat valves 23 and 24 and a valve piston 25 for operating said valves.

The duplex pressure pump governor 3 may comprise a casing containing a steam valve 26, a piston 27 for operating said valve, an excess pressure head 28, and a maximum pressure head 29. The excess pressure head 28 includes a valve 30 operable by diaphragm 31 for controlling the fluid pressure on piston 27 and said diaphragm is subject to the pressure of an adjustable coil spring 32. The maximum pressure head 29 includes a valve 33 operable by diaphragm 34 for also controlling the fluid pressure on piston 27, said diaphragm being subject to the pressure of an adjustable spring 35.

In order to permit an emergency application of the brakes to be made by the engineer on the second locomotive in case of double heading, the usual cut-out cock in the brake pipe connection to the brake valve is omitted, so that the engineer will not have to open a cut-out cock in the brake pipe in order to effect a reduction in brake pipe pressure.

A cut-out cock 36, however, is provided in the main reservoir pipe 37, leading from the main reservoir 4 to the brake valve device, so that when the cut-out cock is closed on the second locomotive, the supply of fluid from the main reservoir through the brake valve on the second engine to the brake pipe is prevented.

Since main reservoir pressure is cut off from the rotary valve chamber 10 of the automatic brake valve when the cut-out cock 36 is closed on the second engine, it is desirable to supply fluid pressure to said chamber for the purpose of ensuring that the rotary valve 7 will be held to its seat and this is accomplished through the operation of the valve 17 of the feed valve device on the second engine. When the brake pipe pressure is less than the standard degree carried in the system, the diaphragm 18 will be operated by the constant fluid pressure acting in the chamber below the diaphragm to open the valve 17 and then fluid under pressure will be supplied from the brake pipe 5, past the valve 17 to piston chamber 13 and thence through passage 38, passage 39, passage 40, valve chamber 13 to pipe and passage 41. In running position of the brake valve, a port 42 registers with passage 41, so that the rotary valve chamber 10 is charged with fluid under pressure from the brake pipe, to maintain the rotary valve 7 seated.

In the usual locomotive brake equipment, the equalizing reservoir of the equalizing discharge valve mechanism is charged in the release position of the brake valve from the main reservoir by flow from the rotary valve chamber through a port in the rotary valve, while in the present construction, the equalizing reservoir is charged from the brake pipe.

In the release position of the automatic brake valve, as shown in Fig. 2, the brake pipe 5 is connected through a cavity 43 in the rotary valve 7 with passage 44 leading to chamber 45 above the piston of the equalizing discharge valve mechanism 12 and also to the equalizing reservoir 46 which is connected to chamber 45 through a passage 47.

In order to ensure a high main reservoir pressure at the time the brake valve is turned from application position to full release position, according to the present construction, the excess pressure head is cut out of action in release position and for this purpose the main reservoir supply to the diaphragm 31 is cut off in the release position of the automatic brake valve, so that the excess pressure head is cut out of action. Accordingly, the pipe 49 which supplies main reservoir pressure to the diaphragm chamber below diaphragm 31 is connected through passage 50 and cavity 51 in the rotary valve 7 with an exhaust port 52 in the release position of the brake valve. Consequently, the excess pressure head is cut out of operation when the automatic brake valve is in release position, so that the maximum pressure head controls the operation of the steam pump governor.

In operation, when operating in double heading service, the cut-out cock 36 is turned to its closed position on the second engine and the automatic brake valve handle is carried in running position.

If considered necessary, the engineer on the second engine can at any time make an emergency application of the brakes by turning the brake valve handle to emergency position, since there is no cut-out cock in the brake pipe connection to the brake valve device. Fluid under pressure will not be supplied to the brake pipe through the brake valve of the second engine, however, because of the cut-out cock provided in the main reservoir pipe being closed, so that fluid is not supplied from the main reservoir to the rotary valve chamber of the brake valve. The rotary valve 7 of the automatic brake valve is maintained on its seat in double heading on the second engine when the cut-out cock 36 is in its closed position, by fluid supplied from the brake pipe 5 by the opening of the valve 17 of the feed valve device and through port 42 in the rotary valve 7 to said chamber.

In ordinary service, when the automatic brake valve is turned to release position to effect the release of the brakes, fluid is supplied from the main reservoir to the brake pipe at a rapid rate for a predetermined period of time by the operation of the supply valve piston 22 and the timing valve piston 25 and then the brake pipe pressure is maintained at the standard pressure carried in the system by the operation of the slide valve 16, as fully described in my prior pending application Serial No. 594,785, filed October 16, 1922, and hereinbefore referred to.

Instead of permitting the equalizing discharge valve mechanism to vent fluid from the brake pipe directly to the atmosphere upon movement of the brake valve to service application position as in the usual locomotive brake equipment, the discharge in the present case is connected to a passage 53 leading to the seat of the rotary valve 7. In service application position, said passage, as shown in Fig. 3, is connected by a cavity 54 with exhaust port 52.

By this construction, the equalizing discharge valve mechanism is prevented from operating on the second engine in double heading, since in the running position of the brake valve, the discharge outlet of the equalizing discharge valve mechanism is closed and consequently if said mechanism should be operated by the recharging of the brake pipe through the operation of the brake valve on the leading engine, due to the pressure on the under side of the equalizing piston building up faster than the pressure on the equalizing reservoir side, fluid will not be vented from the brake pipe to the atmosphere on the second engine, since the discharge outlet is now cut off from the atmosphere.

Having now described my invention, what I claim as new and desire to secure by Letters Patent, is:—

1. In a fluid pressure brake, the combination with a brake pipe, a brake valve device having a position for venting fluid from the brake pipe to effect an application of the brakes, a main valve, and a pipe through which fluid is supplied from the main reservoir to the brake valve device, of a cut-out cock in said pipe and a non-obstructible connection from the brake pipe to said brake valve device.

2. In a fluid pressure brake, the combination with a duplex pressure steam pump governor having an excess pressure head and a maximum pressure head, of a brake valve device having a release position and means operative in the release position of the brake valve device for cutting said excess pressure head out of action.

3. In a fluid pressure brake, the combination with a main reservoir and a duplex pressure steam pump governor having an excess pressure head including a diaphragm normally subject to main reservoir pressure and a maximum pressure head, of a brake valve device having a release position in which the supply of fluid from the main reservoir to said diaphragm is cut off to thereby cut said excess pressure head out of action.

4. In a fluid pressure brake, the combination with a main reservoir and a duplex pressure steam pump governor having an excess pressure head including a diaphragm normally subject to main reservoir pressure and a maximum pressure head, of a brake valve device for controlling the supply of fluid from the main reservoir to said diaphragm and adapted in release position to connect said diaphragm to the atmosphere.

5. In a fluid pressure brake, the combination with a brake pipe, of a brake valve device for controlling the pressure in the brake pipe, comprising a rotary valve for automatic control, a rotary valve for independent control, a main brake valve section, and a section adapted to be applied to the main section and having a seat for the independent rotary valve and an integral casing portion enclosing the automatic rotary valve and forming the rotary valve chamber of the automatic rotary valve.

6. In a fluid pressure brake, the combination with a brake pipe, of a brake valve device comprising a rotary valve, an equalizing discharge valve mechanism, and an equalizing reservoir connected to one side of said equalizing discharge valve mechanism, and means for connecting the equalizing reservoir side of the equalizing discharge valve mechanism to the brake pipe in the release position of said rotary valve.

In testimony whereof I have hereunto set my hand.

CLYDE C. FARMER.